(12) United States Patent
Khandelwal et al.

(10) Patent No.: US 9,495,100 B1
(45) Date of Patent: Nov. 15, 2016

(54) SHIFTING A DEFRAG OPERATION IN A MIRRORED SYSTEM

(71) Applicant: International Business Machines Corporation, Armonk, NY (US)

(72) Inventors: Nikhil Khandelwal, Tucson, AZ (US); Gregory E. McBride, Vail, AZ (US); David C. Reed, Tucson, AZ (US); Richard A. Welp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/752,953

(22) Filed: Jun. 28, 2015

(51) Int. Cl.
*G06F 12/02* (2006.01)
*G06F 3/06* (2006.01)

(52) U.S. Cl.
CPC ............ *G06F 3/0608* (2013.01); *G06F 3/064* (2013.01); *G06F 3/0683* (2013.01)

(58) Field of Classification Search
CPC ..... G06F 3/0608; G06F 3/064; G06F 3/0683
See application file for complete search history.

(56) References Cited

U.S. PATENT DOCUMENTS

| | | | |
|---|---|---|---|
| 7,020,032 B2 | 3/2006 | Ball et al. | |
| 8,086,810 B2 | 12/2011 | Huber et al. | |
| 8,606,755 B2 | 12/2013 | Cohen et al. | |
| 8,639,900 B2 | 1/2014 | Reed et al. | |
| 8,751,454 B1 * | 6/2014 | Bushman | G06F 3/061 707/640 |
| 2005/0162944 A1 * | 7/2005 | Ball | G06F 11/1666 365/200 |
| 2013/0185264 A1 * | 7/2013 | Cohen | G06F 11/2069 707/656 |

OTHER PUBLICATIONS

U.S. Appl. No. 15/040,231, Entitled "Shifting a Defrag Operation in a Mirrored System", filed on Feb. 10, 2016.
Appendix P.: List of IBM Patents or Patent Applications Treated as Related, Dated Feb. 10, 2016, 2 pages.

* cited by examiner

*Primary Examiner* — Hiep Nguyen
(74) *Attorney, Agent, or Firm* — William H. Hartwell

(57) ABSTRACT

A method for defragmenting volumes in a mirrored system. The method includes suspending one or more updates from being mirrored from a first set of tracks on a first server to a second set of tracks on a second server. A defragmenting process is performed on the second server. The defragmentation process stores a before and after mapping of the second set of tracks, wherein the before and after mapping includes information identifying at least one track of the second set of tracks and a corresponding first location of the respective track before the defragmenting and a second location of the respective track after the defragmenting. The method further includes, upon the defragment process completion, relocating at least one track of the first set of tracks on the first server according to the stored before and after mapping of the corresponding second set of tracks on the second server.

20 Claims, 3 Drawing Sheets

SHIFTING A DEFRAG OPERATION IN A MIRRORED SYSTEM

BACKGROUND

The present invention relates generally to the field of defragmenting, and more particularly to shifting a defrag operation in a mirrored system.

In today's data storage environments, operations against storage volumes, also referred to as a hard disk drives (HDD), require multiple passes of disk reads and writes. A single hard disk usually consists of several platters. Each platter has the same number of tracks, and a track location that cuts across all platters is called a cylinder.

Disk reads/writes are performed by disk read/write heads that are the small parts of a disk drive that move above the disk platter and transform the platter's magnetic field into electrical current reading or writing to the disk. An example of disk read/writes would be a volume defragmentation (DEFRAG). In the maintenance of file systems, defragmentation is a process that reduces the amount of fragmentation by physically organizing the contents of the storage device into the smallest number of contiguous regions (i.e., fragments). The defragmentation process also attempts to create larger regions of free space using compaction to impede the return of fragmentation. Some defragmentation utilities try to keep smaller files within a single directory together, as they are often accessed in sequence.

Many known data storage systems use mirrored volumes. In data storage, disk mirroring is the replication of logical disk volumes onto separate physical hard disks in real time to ensure continuous availability. A mirrored volume is a complete logical representation of separate volume copies.

SUMMARY

Embodiments of the present invention disclose a method, computer program product, and system for defragmenting volumes in a mirrored system. The method includes suspending one or more updates from being mirrored from a first set of tracks on a first server to a second set of tracks on a second server. The method further includes a defragmenting process being performed on the second server. The defragmentation process stores a before and after mapping of the second set of tracks, wherein the before and after mapping includes information identifying at least one track of the second set of tracks and a corresponding first location of the respective track before the defragmenting and a second location of the respective track after the defragmenting. The method further includes, upon the defragment process completion, relocating at least one track of the first set of tracks on the first server from a first location on the first server to a second location on the first server according to the stored before and after mapping of the corresponding second set of tracks on the second server.

DETAILED DESCRIPTION

Embodiments in accordance with the present invention recognize that a defragmentation process can result in high CPU usage and delays in data or volume read/write access. Many computer clients in today's data storage environments mirror critical disk volumes to prevent data loss. Multiple pass DEFRAG writes in a defragmentation process are also mirrored to remote sites, which leads to an increase in network traffic. As such, an alternative is required to allow for DEFRAG activity to take advantage of spare CPU cycles at the remote site to perform the required multiple pass DEFRAG activity required.

Figure 1:
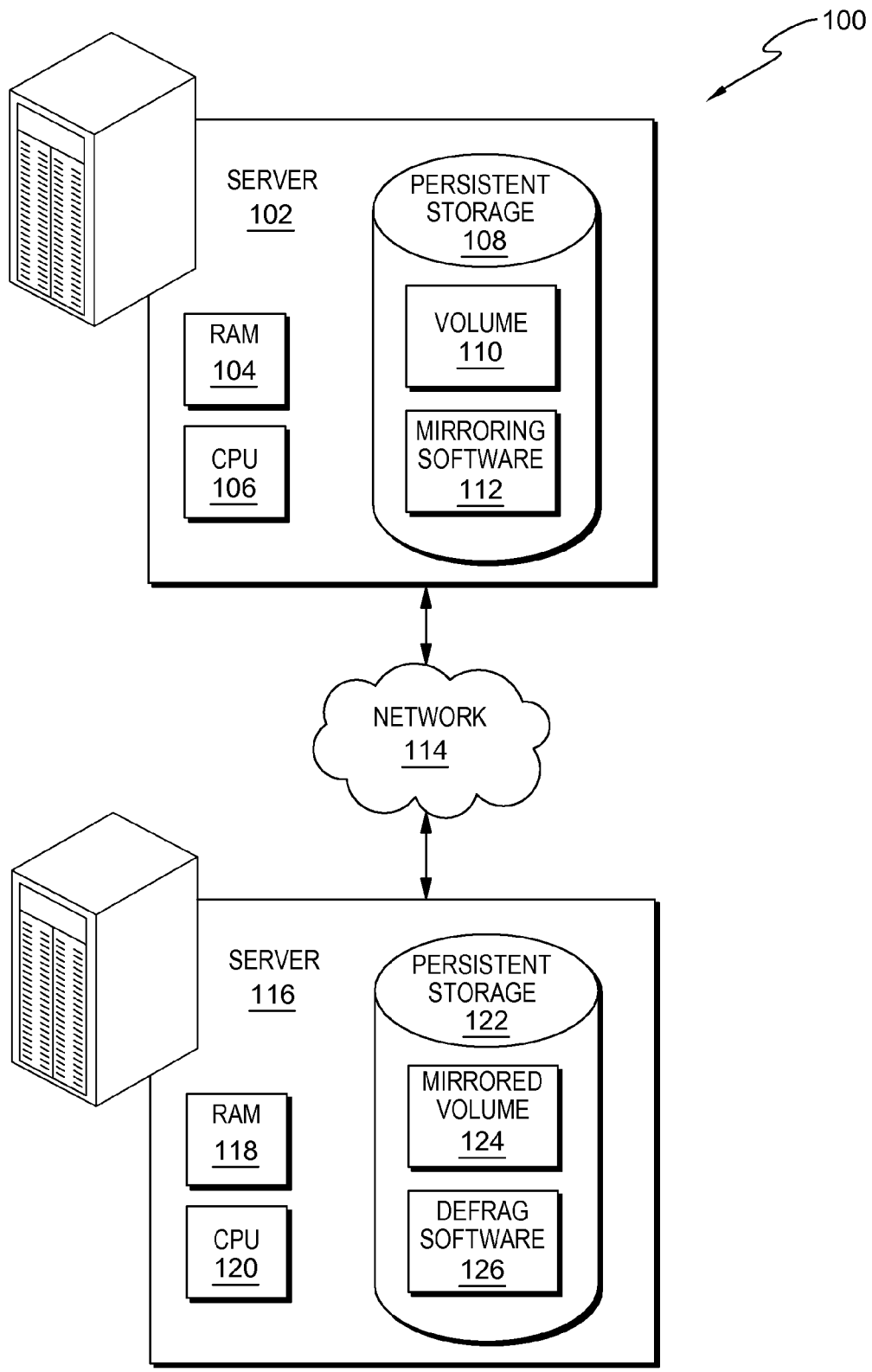
FIG. 1 is a functional block diagram illustrating a data storage environment, in an embodiment in accordance with the present invention.

Embodiments in accordance with the present invention will now be described in detail with reference to the Figures. FIG. 1 is a functional block diagram, generally designated 100, illustrating a data storage environment, in an embodiment in accordance with the present invention.

Data storage environment 100 includes server 102 and server 116, all interconnected over network 114. Server 102 includes RAM 104, central processing unit 106, and persistent storage 108. Server 102 may be a Web server, or any other electronic device or computing system, capable of processing program instructions and receiving and sending data. In some embodiments, server 102 may be a laptop computer, a tablet computer, a netbook computer, a personal computer (PC), a desktop computer, a personal digital assistant (PDA), a smart phone, or any programmable electronic device capable of communicating over a data connection to network 114. In other embodiments, server 102 may represent server computing systems utilizing multiple computers as a server system, such as in a distributed computing environment. In general, server 102 is representative of any electronic devices or combinations of electronic devices capable of executing machine-readable program instructions and communicating with server 116 via network 114 and with various components and devices within data storage environment 100.

Server 102 includes persistent storage 108. Persistent storage 108 may, for example, be a hard disk drive. Alternatively, or in addition to a magnetic hard disk drive, persistent storage 108 may include a solid state hard drive, a semiconductor storage device, read-only memory (ROM), erasable programmable read-only memory (EPROM), flash memory, or any other computer-readable storage medium that is capable of storing program instructions or digital information. Volume 110 is stored in persistent storage 108, which also includes operating system software, as well as software that enables server 102 to perform defragmentation processes, and communicate with server 116, as well as other computing devices over a data connection on network 114. Volume 110 and mirroring software 112 are stored in persistent storage 108. Volume 110 contains all the data stored on the logical drive. In the context of computer operating systems, a volume, also referred to as a logical drive, is a single accessible storage area with a single file system, typically, though not necessarily, resident on a single partition of a hard disk. Mirroring software 112 enables server 102 to mirror data written or updated on volume 110 to mirrored volume 124 on persistent storage 122 in server 116.

In FIG. 1, network 114 is shown as the interconnecting fabric between data protection server 102 and server 116. In practice, network 114 may be any viable data transport network. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between data protection server 102 and server 116 in accordance with an embodiment of the invention.

Data storage environment 100 also includes server 116. Server 116 includes RAM 118, central processing unit 120, and persistent storage 122. In various embodiments of the present invention, server 116 can each respectively be a laptop computer, tablet computer, netbook computer, personal computer (PC), a desktop computer, a personal digital assistant (PDA), a smart phone, or any programmable electronic device capable of communicating with server 102 via network 114. Persistent storage 122 includes mirrored volume 124 and defrag software 126. Mirrored volume 124 is a logical representation of volume 110 on persistent storage 108 of server 102. Defrag software 126 enables server 116 to perform defragmentation operations on persistent storage 122 and volume 110 on persistent storage 108 in server 102.

Figure 2:
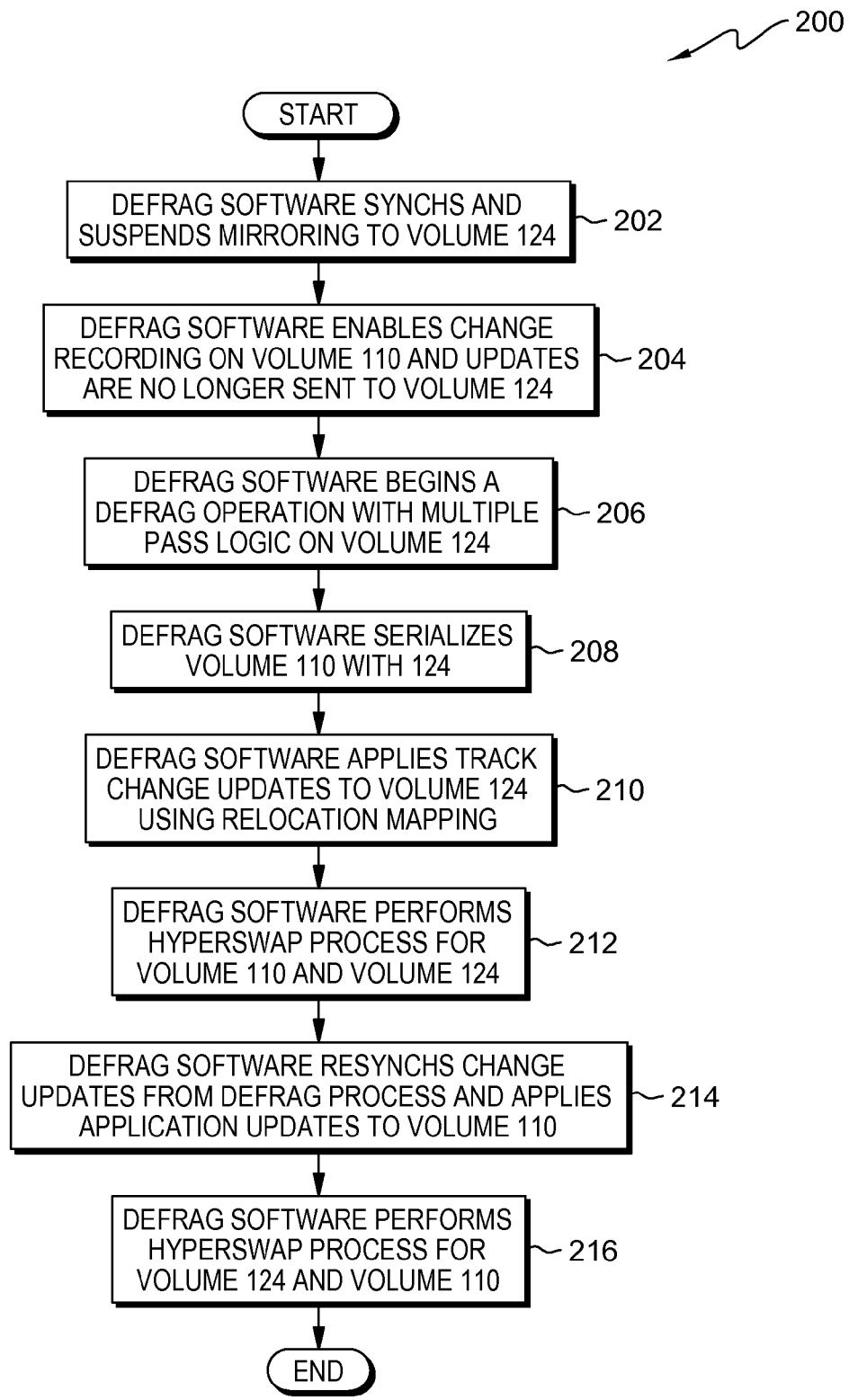
FIG. 2 is a flowchart depicting operational steps of defrag operation, on a mirrored volume within the data storage environment of FIG. 1, in an embodiment in accordance with the present invention.

FIG. 2 is a flowchart, generally designated 200, depicting operational steps of defrag operation, on a mirrored volume within the data storage environment of FIG. 1, in an embodiment in accordance with the present invention. In an example embodiment, defrag software 126 performs a defrag operation on a secondary volume, also referred to as mirrored volume 124, by suspending mirroring of synchronous volumes (that is, primary volume 110 and mirrored volume 124, as depicted in step 202. The mirroring of synchronous volumes is suspended when updates to the primary volume are no longer sent to the secondary volume. In other example embodiments, the defrag operation may begin on the primary volume (e.g., volume 110), and all track updates, as discussed in step 210, would be sent to, and recorded, on the secondary volume (e.g., mirrored volume 124).

In step 204, defrag software 126 enables change recording on the primary volume, also referred to as volume 110, to track all writes and/or updates to the primary volume. Change recording is a process of tracking any writes and/or updates to the data stored in a volume. In the example embodiment, defrag software 126 enables the change recording on server 102 after mirroring is suspended between volume 110 and mirrored volume 124. In other example embodiments, the change records, also referred to as track updates, may be stored on server 116 or another computing device on network 114 while the defragmentation process is running on mirrored volume 124.

Defrag software 126 then begins a DEFRAG operation with multiple pass logic on volume 124 as depicted in step 206. Multiple pass logic in a disk defrag uses a recursive approach where file fragments are moved as needed to free the necessary space to write an entire defragmented file. The defragmentation process restarts once it reaches the end of the disk, and repeats until there are no more files to move. The result is an operation that requires fewer CPU cycles and memory, but is slower because the file fragments need to be moved several times. In other example embodiments, the defrag software 126 may use single pass logic on volume 124. In a single pass defrag, the HDD is analyzed and a "virtual cluster map" is created of the defragmented HDD. If a defragmentation is required, the defragmentation process will recreate intermediate steps in order to accommodate the new files. The result is an operation that requires more memory and CPU cycles but might be faster and able to work with less free space or a higher fragmentation ratio.

In step 208, defrag software 126 serializes volume 110 on server 102 with volume 124 on server 116. Serializing volume 110 prevents any updates from occurring on either volume while volume 110 is being serialized with mirrored volume 124. When the volumes are serialized, both volume 110 and mirrored volume 124 are locked, or exclusively reserved, to prevent applications or processes from reading/writing to the disks. During the serialization process, the information in a volume table of contents (VTOC) is updated regarding the track layout of mirrored volume 124. A VTOC is a data structure that provides a way of locating the data sets that reside on a particular disk volume. It can reside within the first 64K tracks on the volume, and lists the names of each data set on the volume as well as size, location, and permissions. Additionally, it contains an entry for every area of contiguous free space on the volume. Because mirroring has been suspended, the tracks on mirrored volume 124 are now in a different location than they are on the suspended primary volume (i.e., volume 110). As such, defrag software 126 needs to keep a before and after mapping of each track location as it changes throughout the defragmentation process. When the defragmentation process is complete, the data sets on the primary system are serialized using standard data set lock via exclusive enqueues (ENQs) along with the VTOC on the volume. The data set lock occurs when the hardware (i.e., volume 110 and volume 124) is reserved exclusively for the enqueue (i.e., writes to the hard disk). This ensures that no users will have outdated control block information with obsolete track locations.

When the defrag operation is completed on mirrored volume 124, defrag software 126 applies the track updates from volume 110 to the new location on mirrored volume 124 using relocation mapping as depicted in step 210. At this point, the tracks that had been updated on volume 110 after the mirror was suspended are now applied to the defragmented mirrored volume 124. The tracks are applied to the new location using the before and after mapping to ensure they are relocated or placed at the updated location. In other example embodiments, the track updates on server 102 for volume 110 may be mirrored across to server 116 in real-time to speed up the defragmentation process.

In step 212, defrag software 126 performs a hyperswap process for volume 110 and mirrored volume 124. Upon applying the track updates to the defragmented mirrored volume 124, a hyperswap process takes place for only those volumes involved in the defragmentation process. A hyperswap process switches the order of the primary and secondary volumes for applications and/or processes using the logical volume. When a hyperswap occurs, the applications and/or processes access the secondary volume for read and write operations as if the secondary volume were the primary volume. Stated another way, a hyperswap reverses the mirroring direction of the primary and secondary volumes such that, upon the performance of the hyperswap, the secondary volume mirrors updates to the primary volume. In other example embodiments, the hyperswap process may be performed across multiple servers in data storage environment 100.

Defrag software 126 then resynchs the change updates from the defragmentation process and applies application updates to volume 110 as depicted in step 214. The resynchronization is driven by merging the change recording bitmaps from both volumes. The change recording bitmaps are the before and after track locations of the pending updates to volume 110 during the defragmentation process.

The resynchronization causes changes to be updated back to the original primary volume 110. When the resynch process completes, both volumes are substantially identical.

In step 216, defrag software 126 then performs a second hyperswap process for volume 124 and volume 110. The second hyperswap process places volume 110 and mirrored volume 124 back in their original positions (i.e., volume 110 is now the primary volume and mirrored volume 124 is the secondary volume again) and state prior to when the defragmentation process began. In other example embodiments, the final hyperswap process may not be performed, leaving the volumes in the swapped state. In these embodiments, the volumes might only be swapped when a defragmentation process on the mirrored volumes completes.

Figure 3:
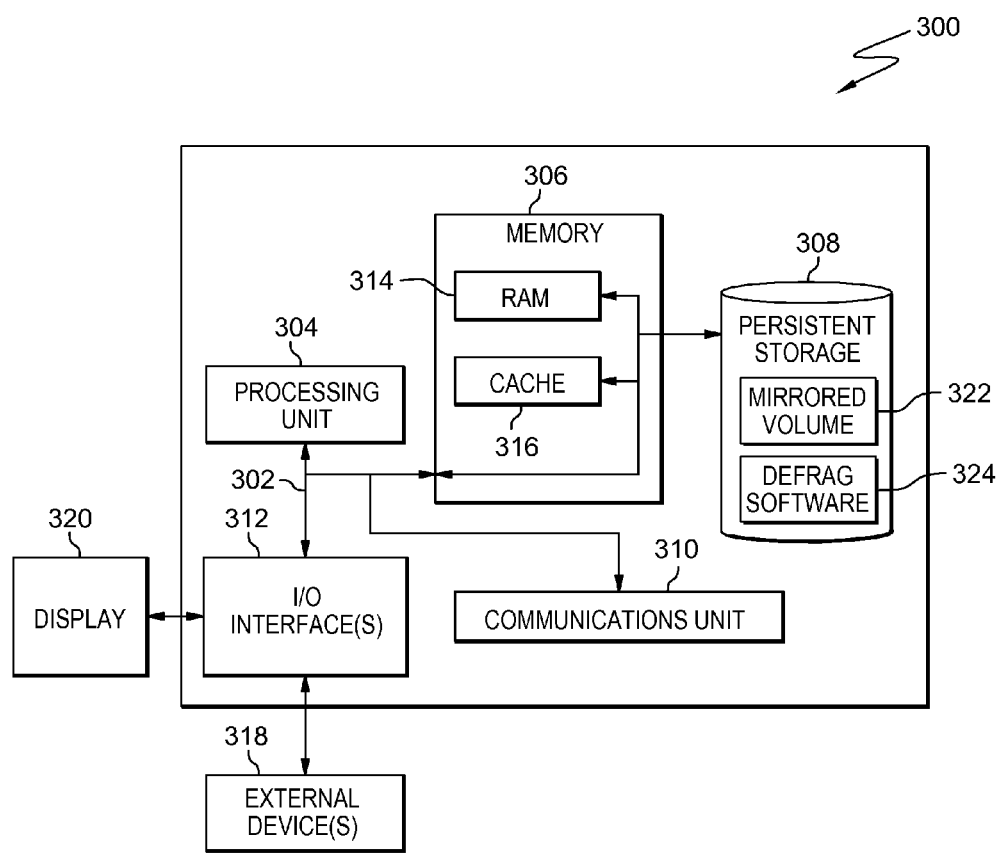
FIG. 3 depicts a block diagram of components of the server computer executing the defrag operation, in an embodiment in accordance with the present invention.

FIG. 3 depicts a block diagram, generally designated 300, of components of the server computer executing the defrag operation, in an embodiment in accordance with the present invention. It should be appreciated that FIG. 3 provides only an illustration of one implementation and does not imply any limitations with regard to the environments in which different embodiments may be implemented. Many modifications to the depicted environment may be made.

Server 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 314 and cache memory 316. In general, memory 306 can include any suitable volatile or non-volatile computer readable storage media.

Mirrored volume 322 and defrag software 324 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of network 114 and server 116. In these examples, communications unit 310 includes one or more network interface cards. Communications unit 310 may provide communications through the use of either or both physical and wireless communications links. Mirrored volume 322 and defrag software 324 may be downloaded to persistent storage 308 through communications unit 310.

I/O interface(s) 312 allows for input and output of data with other devices that may be connected to server 102. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., mirrored volume 322 and defrag software 324, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for defragmenting volumes in a mirrored system, the method comprising:
    suspending, by one or more processors, a mirroring of updates from a first set of tracks on a first server to a second set of tracks on a second server;
    performing, by one or more processors, a defragmentation process on the second server;
    storing, by one or more processors, a before and after mapping of the second set of tracks, wherein the before and after mapping includes information identifying at least one track of the second set of tracks and a corresponding first location of the respective track before the performing of the defragmentation process and a second location of the respective track after the performing of the defragmentation process; and
    relocating, by one or more processors, at least one track of the first set of tracks on the first server from a first location on the first server to a second location on the first server according to the stored before and after mapping of the corresponding second set of tracks on the second server.

2. The method of claim 1, further comprising:
    during the performing of the defragmentation process, tracking and storing, by one or more processors, one or more updates to the first set of tracks on the first server.

3. The method of claim 2, further comprising:
    prior to the relocating, applying, by one or more processors, the one or more stored updates to the first set of tracks on the first server to the second set of tracks on the second server.

4. The method of claim 3, further comprising:
    prior to the applying, serializing, by one or more processors, the first server with the second server, wherein a volume table of contents (VTOC) on the first server is updated according to the stored before and after mapping of the second set of tracks on the second server.

5. The method of claim 3, further comprising:
    upon applying the one or more stored updates to the second set of tracks, performing a first hyperswap, by one or more processors, wherein the first hyperswap reverses a mirroring direction of the first server and the second server such that, upon performing the first hyperswap, the second server mirrors updates to the first server.

6. The method of claim 5, further comprising
    upon relocating, performing a second hyperswap, by one or more processors, wherein the second hyperswap reverses the mirroring direction of the first server and the second server such that, upon performing the second hyperswap, the first server mirrors updates to the second server.

7. The method of claim 6, further comprising:
during the relocating, tracking and storing, by one or more processors, one or more updates to the second set of tracks on the second server; and
upon relocating, and prior to performing the second hyperswap, applying, by one or more processors, the one or more updates to the second set of tracks on the second server to the first set of tracks on the first server.

8. A computer program product for defragmenting volumes in a mirrored system, the computer program product comprising:
one or more computer readable storage media and program instructions stored on the one or more computer readable storage media, the program instructions comprising:
program instructions to suspend a mirroring of updates from a first set of tracks on a first server to a second set of tracks on a second server;
program instructions to perform a defragmentation process on the second server;
program instructions to store a before and after mapping of the second set of tracks, wherein the before and after mapping includes information identifying at least one track of the second set of tracks and a corresponding first location of the respective track before the performing of the defragmentation process and a second location of the respective track after the performing of the defragmentation process; and
program instructions to relocate at least one track of the first set of tracks on the first server from a first location on the first server to a second location on the first server according to the stored before and after mapping of the corresponding second set of tracks on the second server.

9. The computer program product of claim 8, further comprising:
program instructions to, during the performing of the defragmentation process, track and store one or more updates to the first set of tracks on the first server.

10. The computer program product of claim 9, further comprising:
program instructions to, prior to the relocating, apply the one or more stored updates to the first set of tracks on the first server to the second set of tracks on the second server.

11. The computer program product of claim 10, further comprising:
program instructions to, prior to the applying, serialize the first server with the second server, wherein a volume table of contents (VTOC) on the first server is updated according to the stored before and after mapping of the second set of tracks on the second server.

12. The computer program product of claim 10, further comprising:
program instructions to, upon applying the one or more stored updates to the second set of tracks, perform a first hyperswap, wherein the first hyperswap reverses a mirroring direction of the first server and the second server such that, upon performing the first hyperswap, the second server mirrors updates to the first server.

13. The computer program product of claim 12, further comprising
program instructions to, upon relocating, perform a second hyperswap, wherein the second hyperswap reverses the mirroring direction of the first server and the second server such that, upon performing the second hyperswap, the first server mirrors updates to the second server.

14. The computer program product of claim 13, further comprising:
program instructions to, during the relocating, track and store one or more updates to the second set of tracks on the second server; and
program instructions to, upon relocating, and prior to performing the second hyperswap, apply the one or more updates to the second set of tracks on the second server to the first set of tracks on the first server.

15. A computer system for defragmenting volumes in a mirrored system, the computer system comprising:
one or more computer processors;
one or more computer readable storage media;
program instructions stored on the computer readable storage media for execution by at least one of the one or more processors, the program instructions comprising:
program instructions to suspend a mirroring of updates from a first set of tracks on a first server to a second set of tracks on a second server;
program instructions to perform a defragmentation process on the second server;
program instructions to store a before and after mapping of the second set of tracks, wherein the before and after mapping includes information identifying at least one track of the second set of tracks and a corresponding first location of the respective track before the performing of the defragmentation process and a second location of the respective track after the performing of the defragmentation process; and
program instructions to relocate at least one track of the first set of tracks on the first server from a first location on the first server to a second location on the first server according to the stored before and after mapping of the corresponding second set of tracks on the second server.

16. The computer system of claim 15, further comprising:
program instructions to, during the performing of the defragmentation process, track and store one or more updates to the first set of tracks on the first server.

17. The computer system of claim 16, further comprising:
program instructions to, prior to the relocating, apply the one or more stored updates to the first set of tracks on the first server to the second set of tracks on the second server.

18. The computer system of claim 17, further comprising:
program instructions to, prior to the applying, serialize the first server with the second server, wherein a volume table of contents (VTOC) on the first server is updated according to the stored before and after mapping of the second set of tracks on the second server.

19. The computer system of claim 17, further comprising:
program instructions to, upon applying the one or more stored updates to the second set of tracks, perform a first hyperswap, wherein the first hyperswap reverses a mirroring direction of the first server and the second server such that, upon performing the first hyperswap, the second server mirrors updates to the first server.

20. The computer system of claim 19, further comprising:
program instructions to, during the relocating, track and store one or more updates to the second set of tracks on the second server;

program instructions to, upon relocating, apply the one or more updates to the second set of tracks on the second server to the first set of tracks on the first server; and program instructions to, upon applying the one or more updates to the second set of tracks on the second server to the first set of tracks on the first server, perform a second hyperswap, wherein the second hyperswap reverses the mirroring direction of the first server and the second server such that, upon performing the second hyperswap, the first server mirrors updates to the second server.

\* \* \* \* \*